(12) United States Patent
Miyashita

(10) Patent No.: US 10,495,914 B2
(45) Date of Patent: Dec. 3, 2019

(54) ELECTRO-OPTICAL DEVICE AND ELECTRONIC APPARATUS

(71) Applicant: SEIKO EPSON CORPORATION, Tokyo (JP)

(72) Inventor: Tomoaki Miyashita, Shimosuwa-machi (JP)

(73) Assignee: SEIKO EPSON CORPORATION, Tokyo (JP)

( * ) Notice: Subject to any disclaimer, the term of this patent is extended or adjusted under 35 U.S.C. 154(b) by 168 days.

(21) Appl. No.: 15/886,089

(22) Filed: Feb. 1, 2018

(65) Prior Publication Data

US 2018/0224692 A1    Aug. 9, 2018

(30) Foreign Application Priority Data

Feb. 6, 2017    (JP) .................................. 2017-019310

(51) Int. Cl.
*G02F 1/1333* (2006.01)
*G02F 1/1345* (2006.01)

(52) U.S. Cl.
CPC .... *G02F 1/133385* (2013.01); *G02F 1/13452* (2013.01); *G02F 1/133308* (2013.01)

(58) Field of Classification Search
None
See application file for complete search history.

(56) References Cited

U.S. PATENT DOCUMENTS

| | | | | |
|---|---|---|---|---|
| 2010/0277670 A1* | 11/2010 | Hamada | ............... | G02B 6/0085 |
| | | | | 349/62 |
| 2011/0122356 A1* | 5/2011 | Saimen | ................ | H05K 1/0269 |
| | | | | 349/149 |
| 2013/0088671 A1* | 4/2013 | Drzaic | ................ | G02F 1/13452 |
| | | | | 349/106 |
| 2015/0316810 A1* | 11/2015 | Shibahara | ............. | G02F 1/1333 |
| | | | | 349/150 |
| 2017/0196133 A1* | 7/2017 | Yamaguchi | ............. | H01L 24/03 |
| 2018/0031902 A1* | 2/2018 | Uchiyama | ........... | G02F 1/13306 |
| 2019/0014664 A1* | 1/2019 | Ahn | ....................... | G06F 3/0412 |

FOREIGN PATENT DOCUMENTS

| | | |
|---|---|---|
| JP | 2010-102219 A | 5/2010 |
| JP | 2011-112666 A | 6/2011 |
| JP | 2015-206815 A | 11/2015 |

* cited by examiner

*Primary Examiner* — Ryan Crockett
(74) *Attorney, Agent, or Firm* — Oliff PLC

(57) ABSTRACT

An electro-optical device includes a plurality of mounting substrates connected to an electro-optical panel. A holder includes a first holder member and a second holder member that support an electro-optical panel from both sides. In addition, a holder includes a first heat dissipation plate portion and a second heat dissipation plate portion on both sides of a part where a first drive IC and a second drive IC are mounted, among a part where a plurality of mounting substrates overlap each other and extend. A second heat dissipation plate portion is configured integrally with a second holder member, and a first heat dissipation plate portion is configured separately from a first holder member and a second heat dissipation plate portion and is fixed to a second heat dissipation plate portion by a fixing unit such as a fixing member or the like.

20 Claims, 8 Drawing Sheets

ELECTRO-OPTICAL DEVICE AND ELECTRONIC APPARATUS

BACKGROUND

1. Technical Field

The present invention relates to an electro-optical device including an electro-optical panel to which a wiring substrate is connected, and an electronic apparatus.

2. Related Art

An electro-optical device such as a liquid crystal device or an organic electroluminescence device may adopt a structure in which a plurality of mounting substrates including a drive IC mounted on a flexible wiring substrate are connected to one side of an electro-optical panel along with high definition, miniaturization, and the like. In addition, in order to dissipate heat generated by the drive IC, a structure has been proposed in which among parts where a plurality of mounting substrates overlap and extend, a part where the drive IC is mounted passes through the inside of a rectangular cylindrical heat dissipation member (refer to JP-A-2010-102219).

Heat generated by a drive IC increases in accordance with high definition, which may affect display quality or reliability of an electro-optical device. However, in the electro-optical device described in JP-A-2010-102219, it is necessary for a plurality of mounting substrates in an overlapped state to pass through the inside of a rectangular cylindrical heat dissipation member in an assembly process, and thereby, there is a problem that it takes much labor and time. In addition, in order for the plurality of mounting substrates in an overlapped state to pass through the inside of the rectangular cylindrical heat dissipation member, it is necessary to provide a sufficient space between the mounting substrate and the rectangular cylindrical heat dissipation member, and thereby, there is a problem that heat dissipation from the drive IC is reduced.

SUMMARY

An advantage of some aspects of the invention is to provide an electro-optical device that can easily and properly provide heat dissipation plate portions on both sides of a plurality of mounting substrates, along with high definition, a small size, and high reliability, and an electronic apparatus.

According to an aspect of the invention, there is provided an electro-optical device including an electro-optical panel; a mounting substrate having one end portion connected to the electro-optical panel; a drive IC that is mounted on one surface of the mounting substrate; a flexible wiring substrate having one end portion connected to the other end portion of the mounting substrate; and a holder that supports the electro-optical panel from both sides in a thickness direction. The holder includes a first holder member that supports the electro-optical panel from one side in a thickness direction, a second holder member that supports the electro-optical panel from the other side in a thickness direction, a first heat dissipation plate portion that overlaps a part where the drive IC is mounted from one side of the electro-optical panel in a thickness direction, among parts where a plurality of the mounting substrates overlap and extend, and a second heat dissipation plate portion that overlaps a part where the drive IC of each of the plurality of mounting substrates is mounted from the other side of the electro-optical panel in the thickness direction, among the parts where the plurality of mounting substrates overlap and extend. The second heat dissipation plate portion is formed integrally with the second holder member. The first heat dissipation plate portion is configured separately from the first holder member and the second heat dissipation plate portion, and is fixed to the second heat dissipation plate portion by a fixing unit.

In the device, the holder has a first heat dissipation plate portion and a second heat dissipation plate portion that each overlap a part where drive ICs are mounted from both sides, among parts where a plurality of mounting substrates overlap and extend. Accordingly, heat generated by the drive IC can efficiently escape through the first heat dissipation plate portion and the second heat dissipation plate portion. In addition, the second heat dissipation plate is configured integrally with the second holder member and the first heat dissipation plate is configured separately from the first holder member, so that it is not necessary for a plurality of mounting substrates to pass between the first heat dissipation plate portion and the second heat dissipation plate portion, such as, the second heat dissipation plate portion is disposed on one side of a part where the drive ICs are mounted among parts where the plurality of mounting substrates overlap and extend and thereafter the first heat dissipation plate portion is disposed on the other side. Accordingly, even without taking much labor, the first heat dissipation plate portion and the second heat dissipation plate portion can be easily provided on both sides of the plurality of mounting substrates. In addition, since there is no need to cause the plurality of mounting substrates to pass between the first heat dissipation plate portion and the second heat dissipation plate portion, the first heat dissipation plate portion and the second heat dissipation plate portion can be appropriately disposed on both sides of the plurality of mounting substrates, such as, it is unnecessary to provide a wide gap between a mounting substrate and the first heat dissipation plate, and between the mounting substrate and the second heat dissipation plate. Therefore, it is possible to realize an electro-optical device with high definition, a small size and high reliability.

In the device, it may be possible to adopt a configuration in which the second holder member and the second heat dissipation plate portion are positioned on an incident side of light source light with respect to the electro-optical panel.

In the device, it may be possible to adopt a configuration that the first heat dissipation plate portion includes a first plate portion facing the second heat dissipation plate portion and a plurality of first heat dissipation fins protruding from the first plate portion toward a side opposite to the second heat dissipation plate portion, the second heat dissipation plate portion includes a second plate portion facing the first heat dissipation plate portion and a plurality of second heat dissipation fins protruding from the second plate portion toward a side opposite to the first heat dissipation plate portion, protrusion dimensions of the plurality of second heat dissipation fins from the second plate portion are larger than protrusion dimensions of the plurality of first heat dissipation fins from the first plate portion. In this case, even in a case where heat of the second holder member whose temperature increases due to incident light source light is transmitted to the second heat dissipation plate portion, an increase of the temperature of the second heat dissipation plate portion can be suppressed. In addition, since the protrusion dimension of the first heat dissipation fin is small, it is possible to reduce a thickness of a part where the first heat dissipation plate portion and the second heat dissipation plate portion are provided.

In the device, it may be possible to adopt a configuration in which each of the plurality of mounting substrates includes the drive IC of which at least a part overlaps each other. In this case, since heat generating sources configured by drive ICs are collectively disposed, it is possible to easily configure a heat dissipation structure which uses a first heat dissipation plate portion and a second heat dissipation plate portion.

In the device, it may be possible to adopt a configuration in which a refrigerant passage extending along a side of the electro-optical panel is provided in the second holder member. In this case, even in a case where temperature of a second holder member increases due to incident light source light, an increase of the temperature of the second holder member can be suppressed by making a refrigerant such as air or liquid flow into a refrigerant passage.

In the device, it may be possible to adopt a configuration in which the refrigerant passage extends along a plurality of sides of the electro-optical panel. In this case, even in a case where temperature of a second holder member increases due to incident light source light, an increase of the temperature of the second holder member can be reliably suppressed by making a refrigerant such as air or liquid flow into a refrigerant passage.

In the device, it may be possible to adopt a configuration in which the second holder member includes a frame shape portion facing the first holder member and a flow path configuration plate that is fixed to the frame shape portion so as to overlap each other, and the refrigerant passage may be provided between the frame shape portion and the flow path configuration plate. In this case, it is possible to easily configure a refrigerant passage in a second holder member.

In the device, it may be possible to adopt a configuration in which one end of an extension substrate that is configured by a flexible wiring substrate is connected to an end portion on a side opposite to a side of the electro-optical panel with respect to the drive IC of the mounting substrate, and a connection portion between the mounting substrate and the extension substrate is positioned between the first heat dissipation plate portion and the second heat dissipation plate portion. In this case, it is possible to shorten an expensive flexible wiring substrate used for a mounting substrate. Accordingly, cost can be reduced.

In the device, it may be possible to adopt a configuration in which an interval between the first heat dissipation plate portion and the mounting substrate on the side of the electro-optical panel with respect to the drive IC is wider than an interval between the first heat dissipation plate portion and the extension substrate. In this case, it is possible for heat generated by a drive IC to efficiently escape from between a first heat dissipation plate portion and a mounting substrate.

In the device, it may be possible to adopt a configuration in which an interval between the first heat dissipation plate portion and the second heat dissipation plate portion on the side of the electro-optical panel with respect to the drive IC is wider than an interval between the first heat dissipation plate portion and the second heat dissipation plate portion in a part where the extension substrate is positioned. In this case, it is possible for heat generated by a drive IC to efficiently escape from between a first heat dissipation plate portion and a second heat dissipation plate portion.

In the device, it may be possible to adopt a configuration in which each of the plurality of mounting substrates has one surface side which is connected to the electro-optical panel and on which the drive IC is mounted. In this case, since a flexible wiring substrate used for a mounting substrate can be configured by a single-sided substrate, cost can be reduced.

In the device, it may be possible to adopt a configuration in which the two mounting substrates are connected to one side of the electro-optical panel.

An electro-optical device according to the invention can be used for various electronic apparatuses. In a case where the electronic apparatus is a projection type display device, the projection type display device includes a light source unit that emits light supplied to the electro-optical device, and a projection optical system that projects light modulated by the electro-optical device.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
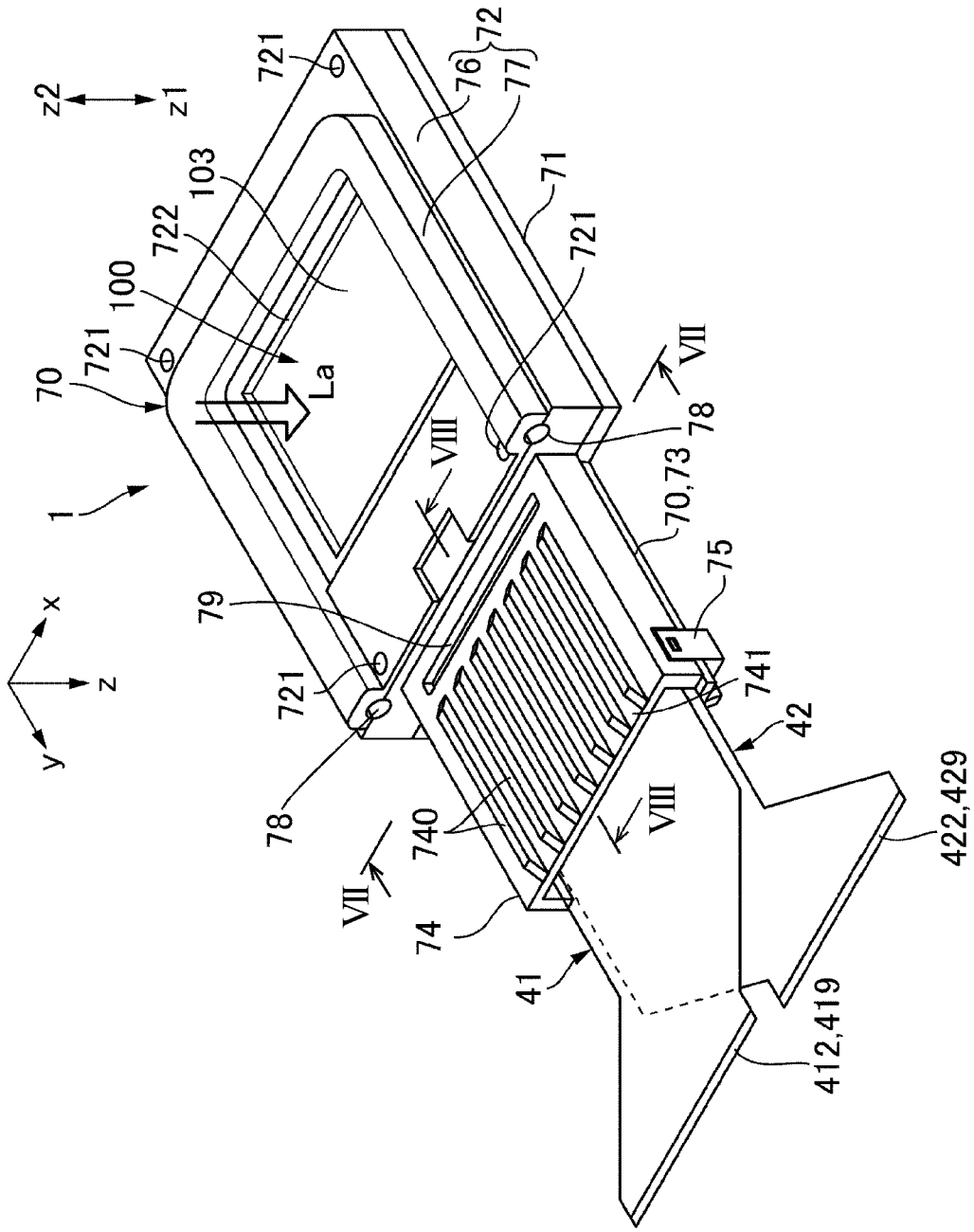
FIG. 1 is an explanatory view schematically illustrating a state where an aspect of an electro-optical device to which the invention is applied is viewed in an oblique direction.

Embodiments of the invention will be described with reference to the drawings. In the drawings referred to in the following description, the respective members are scaled differently from each other and the number of members is reduced so as to reduce each member and the like to a recognizable extent on the drawings. Hereinafter, each direction is represented by using an orthogonal coordinate system configured by the x axis, the y axis, and the z axis.

Configuration of Electro-Optical Device 1

Basic Configuration

Figure 2:
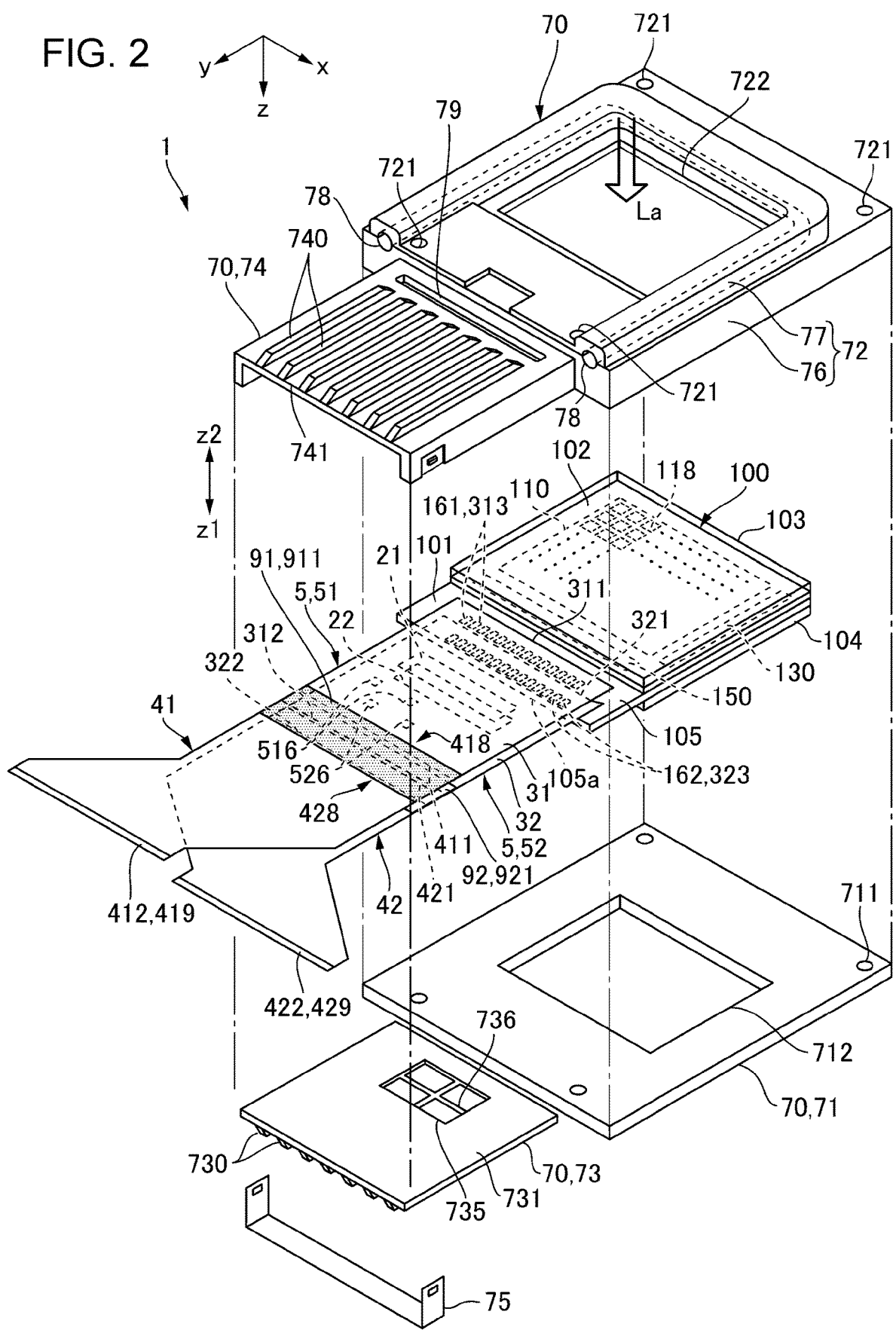
FIG. 2 is an exploded perspective view in a state where a holder is removed from an electro-optical panel, in the electro-optical device illustrated in FIG. 1.

FIG. 1 is an explanatory view schematically illustrating a state where one aspect of an electro-optical device 1 to which the invention is applied is viewed in an oblique direction. FIG. 2 is an exploded perspective view in a state where a holder 70 is removed from an electro-optical panel 100, in the electro-optical device 1 illustrated in FIG. 1. FIG. 2 illustrates a few terminals and a few wires. In addition, in FIG. 2, terminals for connecting a drive IC to a flexible wiring substrate, terminals for connecting the flexible wiring substrate to an extension substrate, and the like are omitted.

In FIG. 1, FIGS. 2 to 4, the electro-optical device 1 includes an electro-optical panel 100, a plurality of mounting substrates 5 connected to one side of the electro-optical panel 100, and a holder 70 for supporting the electro-optical panel 100 from both sides in a depth direction (z direction). The electro-optical device 1 is a liquid crystal device used as a light valve or the like which will be described below, and the electro-optical device 1 includes a liquid crystal panel as the electro-optical panel 100. In the present form, two mounting substrates 5 (a first mounting substrate 51 and a second mounting substrate 52) are connected to the electro-optical panel 100 as the plurality of mounting substrates 5.

In the electro-optical panel 100, a counter substrate 102 on which a common electrode (not illustrated) and the like are formed is bonded to an element substrate 101 on which pixel electrodes 118 and the like are formed, by a sealing material (not illustrated). A liquid crystal layer (not illustrated) is provided in a region surrounded by a sealing material, in the electro-optical panel 100. The electro-optical panel 100 according to the present form is a transmissive liquid crystal panel. Accordingly, a light-transmitting substrate such as a heat-resistant glass or a quartz substrate is used for the element substrate 101 and the counter substrate 102.

In the electro-optical panel 100, a region where pixel electrodes 118 are arranged in the x direction and the y direction is a pixel region 110, and a region overlapping the pixel region 110 is a display region. In the element substrate 101, an extension portion 105 that protrudes from the counter substrate 102 in the y direction is provided, and a plurality of terminals including first terminals 161 for receiving an image signal are arranged at a predetermined pitch, along (x direction) an edge (one side 105a) of the extension portion 105. In addition, in the extension portion 105, a plurality of terminals including second terminals 162 for receiving an image signal are arranged at a predetermined pitch in the x direction at a position on a side opposite to the pixel region 110, in which the first terminals 161 are interposed therebetween. Accordingly, the first terminals 161 and the second terminals 162 are arranged along an edge of the element substrate 101 at a position shifted in the y direction. In FIGS. 1 and 2, the first mounting substrate 51 and the second mounting substrate 52 are illustrated in a shifted state in the x direction such that configurations of the first mounting substrate 51 and the second mounting substrate 52 can be easily understood, but, in the present embodiment, positions of the first terminals 161 and the second terminals 162 in the x direction are the same. However, as illustrated in FIG. 1 and FIG. 2, the first terminals 161 and the second terminals 162 may be shifted by a half pitch in the x direction. The first terminals 161 are connected to a first flexible wiring substrate 31 of the first mounting substrate 51 and include a terminal for receiving an image signal. The second terminals 162 are connected to a second flexible wiring substrate 32 of the second mounting substrate 52 and include a terminal for receiving an image signal.

In the electro-optical panel 100, as illustrated by an arrow La in FIG. 1, light source light incident from the counter substrate 102 side is modulated while the light source light is emitted from the element substrate 101 side, and is emitted as display light. The electro-optical panel 100 includes a dust-proof glass that is placed so as to overlap at least one of a surface on a side opposite to the element substrate 101 side of the counter substrate 102 and a surface on a side opposite to the counter substrate 102 side of the element substrate 101. In the present form, the electro-optical panel 100 includes a first dust-proof glass 103 disposed to overlap on a surface on a side opposite to the element substrate 101 side of the counter substrate 102 through an adhesive or the like, and a second dust-proof glass 104 disposed to overlap and affixed to a surface on a side opposite to the counter substrate 102 side of the element substrate 101 through an adhesive or the like.

Configuration of Holder 70

As illustrated in FIGS. 1 and 2, the holder 70 includes a first holder member 71 formed of a metal which supports the electro-optical panel 100 from one side z1 in a thickness direction by adhesion or the like, and a second holder member 72 formed of a metal which supports the electro-optical panel 100 from the other side z2 in the thickness direction by adhesion or the like. The first holder member 71 and the second holder member 72 are not directly bonded together, but may be bonded by, for example, an adhesive, or may be bonded together by a method such as stopping bolts (not illustrated) through holes 711 and 721 formed in the first holder member 71 and the second holder member 72. In addition, openings 712 and 722 through which light source light or display light passes are formed at positions overlapping a display region (pixel region 110) of the electro-optical panel 100, in the first holder member 71 and the second holder member 72.

In the holder 70 configured as described above, a refrigerant passage 78 extending along a side of the electro-optical panel 100 is provided in the second holder member 72 positioned on an incident side of the light source light. In the present form, the refrigerant passage 78 extends along a plurality of sides of the electro-optical panel 100. In the present embodiment, the refrigerant passage 78 extends along three sides excluding a side to which the mounting substrate 5 of the electro-optical panel 100 is connected, and both ends thereof are open on a side where a side to which the mounting substrate 5 of the electro-optical panel 100 is connected. Accordingly, if air (refrigerant) passes from one end of the refrigerant passage 78, the air can be discharged from the other end of the refrigerant passage 78, and the second holder member 72 can be cooled therebetween. In a case where liquid (refrigerant) such as water passes through the refrigerant passage 78, pipes are connected to both end portions of the refrigerant passage 78. In addition, the refrigerant passage 78 may extend along four sides of the electro-optical panel 100.

In configuring the refrigerant passage 78, the second holder member 72 includes a frame shape portion 76 facing the first holder member 71 and a flow path configuration plate 77 fixed to the frame shape portion 76 so as to overlap each other, and the refrigerant passage 78 is provided between the frame shape portion 76 and the flow path configuration plate 77. More specifically, a groove is formed on a surface on a side opposite to the first holder member 71 in the frame shape portion 76 and on a surface overlapping the frame shape portion 76 in the flow path configuration plate 77, and when the flow path configuration plate 77 overlaps the frame shape portion 76, both grooves overlap each other, and thereby, the refrigerant passage 78 is formed. When the flow path configuration plate 77 overlaps the frame shape portion 76, a pipe is disposed along the groove, and the refrigerant passage 78 may be configured by one or a plurality of pipes. In addition, a hollow-shaped flow path configuration plate 77 may be combined with the frame shape portion 76 without a flow path groove by an adhesive or a screw.

The holder 70 includes a first heat dissipation plate portion 73 formed of a metal which is disposed on a side where the mounting substrate 5 extends in the y direction with respect to the first holder member 71 and a second heat dissipation plate portion 74 formed of a metal which is positioned on a side where the mounting substrate 5 extends in the y direction with respect to the second holder member 72, and the first heat dissipation plate portion 73 and the second heat dissipation plate portion 74 face each other in the z direction.

In the present form, the second heat dissipation plate portion 74 positioned on an incident side of the light source light is formed integrally with the second holder member 72. In contrast to this, the first heat dissipation plate portion 73 is formed separately from the first holder member 71 and the second heat dissipation plate portion 74, and is fixed to the second heat dissipation plate portion 74 by a fixing unit such as a hook-shaped fixing member 75 in a state where a plurality of mounting substrates 5 are interposed between the first heat dissipation plate portion 73 and the second heat dissipation plate portion 74. The first heat dissipation plate portion 73 includes a first plate portion 731 facing the second heat dissipation plate portion 74, and a plurality of first heat dissipation fins 730 protruding from the first plate portion 731 toward a side opposite to the second heat dissipation plate portion 74, and the first heat dissipation fins 730 extend in the y direction in a state of being juxtaposed in the x direction. The second heat dissipation plate portion 74 includes a second plate portion 741 facing the first heat dissipation plate portion 73, and a plurality of second heat dissipation fins 740 protruding from the second plate portion 741 toward a side opposite to the first heat dissipation plate portion 73, and the second heat dissipation fins 740 extend in the y direction in a state of being juxtaposed in the x direction. In addition to the hook-shaped fixing member 75, various means such as fastening by bolts or welding can be adopted as the fixing unit. A slit 79 is formed between the second heat dissipation fin 740 and the second holder member 72, in the second heat dissipation plate portion 74. Accordingly, heat of the second holder member 72 whose temperature increases due to incident light source light is hardly transmitted to the second heat dissipation plate portion 74.

Configuration of Mounting Substrate 5

Figure 3:
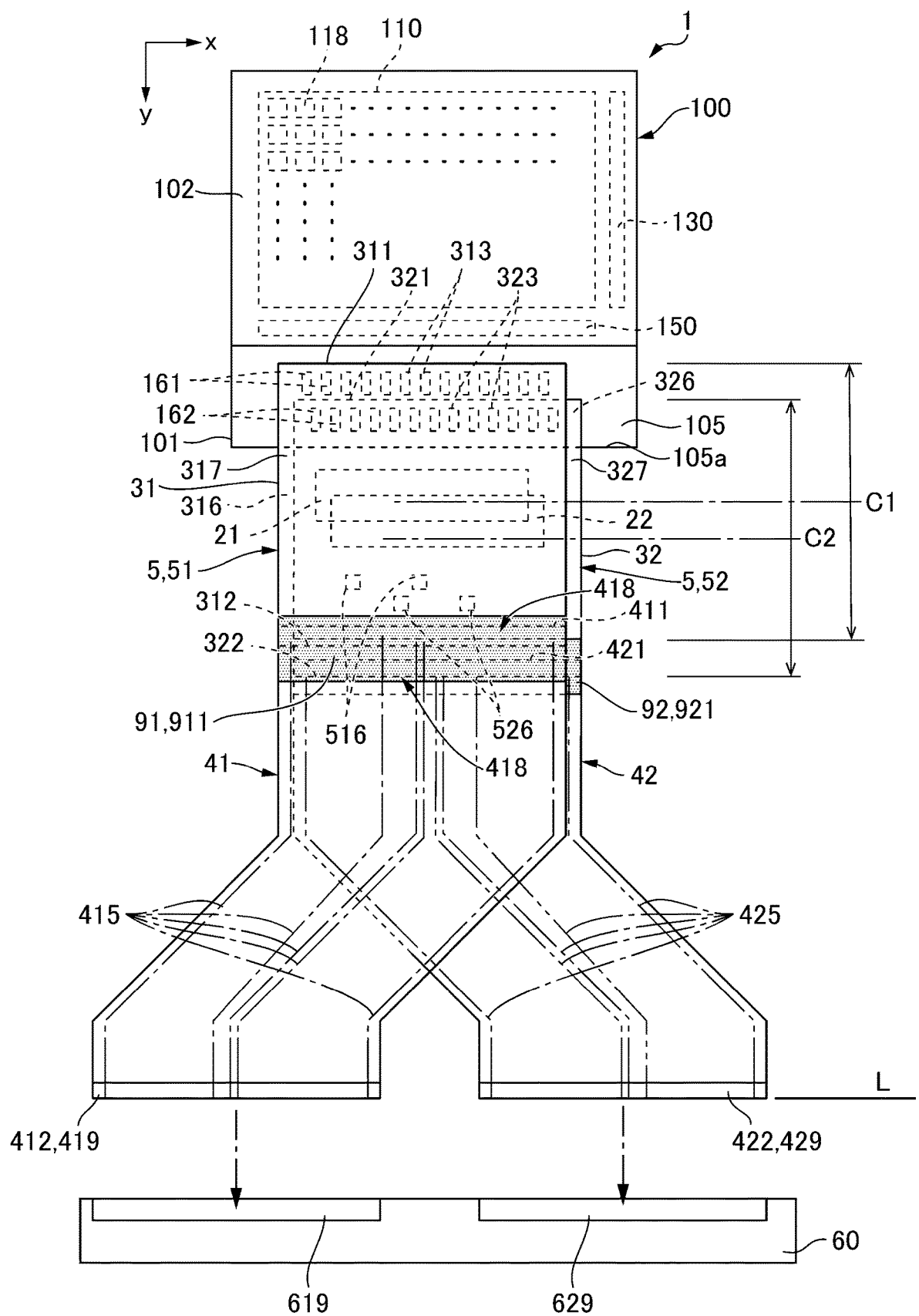
FIG. 3 is an explanatory view schematically illustrating a planar configuration of the electro-optical panel and the like illustrated in FIG. 1.
Figure 4:
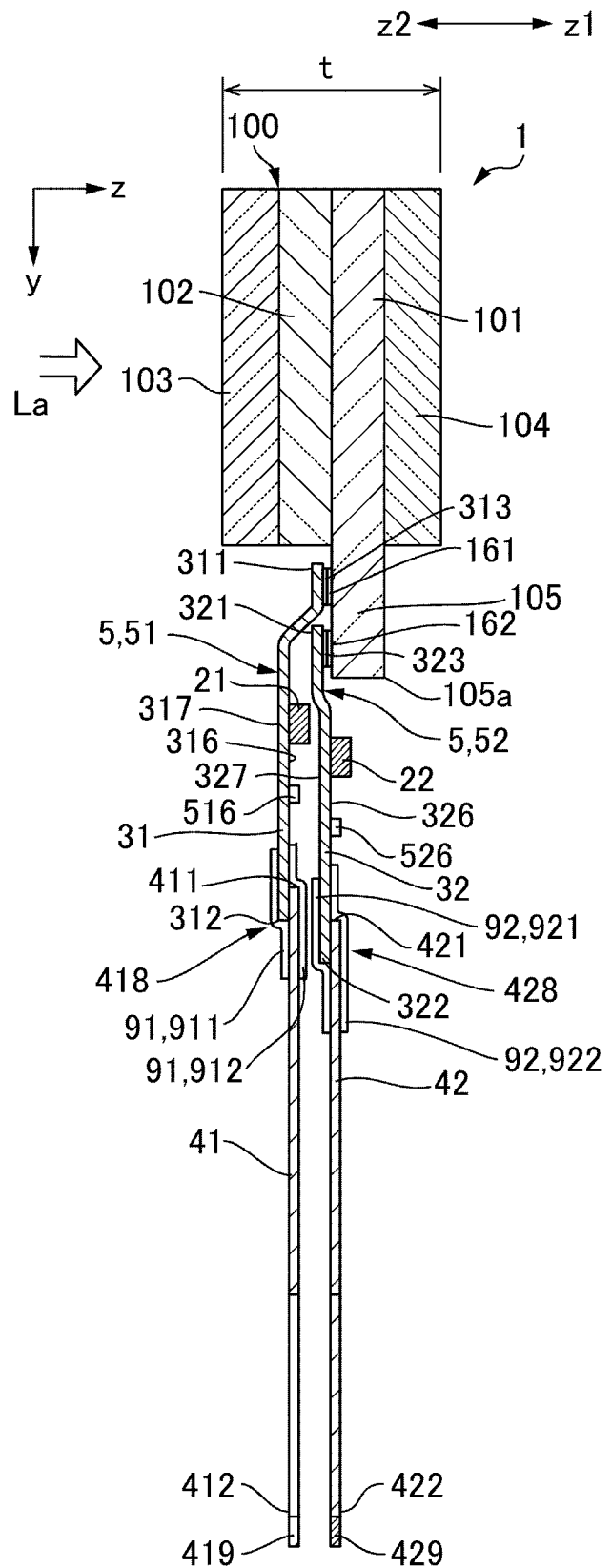
FIG. 4 is an explanatory view schematically illustrating a state where the electro-optical panel and the like illustrated in FIG. 1 are cut along the electro-optical panel and a second flexible wiring substrate.

FIG. 3 is an explanatory view schematically illustrating a planar configuration of the electro-optical panel 100 and the like illustrated in FIG. 1. FIG. 4 is an explanatory view schematically illustrating a state in which the electro-optical panel 100 and the like illustrated in FIG. 1 are cut along (y direction) the electro-optical panel 100 and the second flexible wiring substrate 32. FIG. 3 illustrates the reduced number of terminals and wires. In FIGS. 3 and 4, terminals for connecting the drive IC to the flexible wiring substrate, terminals for connecting the flexible wiring substrate to the extension substrate, and the like are not illustrated. As illustrated in FIGS. 2, 3, and 4, on the element substrate 101 in the electro-optical device 1 of the present form, the plurality of mounting substrates 5 are connected to one side (one side 105a of the element substrate 101) of the electro-optical panel 100 in a state overlapping each other. The mounting substrate 5 is a chip on film (COF) mounting flexible wiring substrate on which a drive IC is mounted on a flexible wiring substrate. In the present embodiment, the two mounting substrates 5 are connected to the electro-optical panel 100 in a state of overlapping. More specifically, in a state where the first mounting substrate 51 on which a first drive IC 21 is mounted on one surface 316 of the first flexible wiring substrate 31, and a second mounting substrate 52 on which the second drive IC 22 is mounted on one surface 326 of the second flexible wiring substrate 32 overlap each other in the z direction on the element substrate 101, the one surface 316 side and the one surface 326 side are connected to the electro-optical panel 100. Accordingly, an image signal and the like are output from the first drive IC 21 and the second drive IC 22 to the electro-optical panel 100 via the first flexible wiring substrate 31 and the second flexible wiring substrate 32. On the one surface 316 and the one surface 326 of the first mounting substrate 51 and the second mounting substrate 52, electronic components 516 and 526 other than the first drive IC 21 and the second drive IC 22 are mounted at a position on a side opposite to the electro-optical panel 100 with respect to the first drive IC 21 and the second drive IC 22. The electronic components 516 and 526 are element components such as capacitors.

In an end portion 311 of the first flexible wiring substrate 31, a plurality of first output electrodes 313 are formed at a position overlapping the element substrate 101, and a plurality of first output electrodes 313 are connected to the first terminals 161 and the like, respectively. In addition, in an end portion 321 of the second flexible wiring substrate 32, a plurality of second output electrodes 323 are formed at a position overlapping the element substrate 101, and a plurality of second output electrodes 323 are connected to the second terminals 162, respectively.

The first flexible wiring substrate 31 and the second flexible wiring substrate 32 both have a certain rectangular planar shape. In addition, the first drive IC 21 and the second drive IC 22 both have a rectangular planar shape. In addition, in the first drive IC 21 and the second drive IC 22, widths (dimensions in the y direction), lengths (dimensions in the x direction), circuit configurations, and the like are equal to each other, and the first drive IC 21 and the second drive IC 22 have the same configuration. In addition, in the first mounting substrate 51 and the second mounting substrate 52, mounting positions of the first drive IC 21 and the second drive IC 22 with respect to the first flexible wiring substrate 31 and the second flexible wiring substrate 32, and widths (dimensions in the x direction), lengths (dimensions in the y direction), wiring patterns, and the like of the first flexible wiring substrate 31 and the second flexible wiring substrate 32 are equal to each other, and the first mounting substrate 51 and the second mounting substrate 52 have the same configuration.

The first flexible wiring substrate 31 and the second flexible wiring substrate 32 configured as described above overlap completely in the x direction, but overlap in a shifted manner in the y direction. Also in the x direction, the first flexible wiring substrate 31 and the second flexible wiring substrate 32 may be shifted by a half pitch (a half pitch of the second terminal 162) of the first terminal 161.

The first drive IC 21 is mounted on a center C1 in a length direction (y direction) of the first flexible wiring substrate 31, or on the element substrate 101 side more than the center C1. In addition, the second drive IC 22 is mounted on a center C2 in a length direction (y direction) of the second flexible wiring substrate 32, or on the element substrate 101 side more than the center C2. In the present embodiment, the first drive IC 21 is mounted on a position biased on the element substrate 101 more than the center C1 of the length direction (y direction) of the first flexible wiring substrate 31. In addition, the second drive IC 22 is mounted on a position biased on the element substrate 101 more than the center C2 of the length direction (y direction) of the second flexible wiring substrate 32.

In addition, both the first drive IC 21 and the second drive IC 22 are disposed in a region where the first flexible wiring substrate 31 and the second flexible wiring substrate 32 overlap each other. Thus, the first drive IC 21 is mounted on the first flexible wiring substrate 31 at a position where at least a part thereof overlaps the second flexible wiring substrate 32, and the second drive IC 22 is mounted on the second flexible wiring substrate 32 at a position where at least a part thereof overlaps the first flexible wiring substrate 31. In addition, the first drive IC 21 and the second drive IC 22 partially overlap each other. In contrast to this, an electronic component 516 mounted on the first flexible wiring substrate 31 and an electronic component 526 mounted on the second flexible wiring substrate 32 do not overlap each other.

A single-sided mounting substrate and a double-sided mounting substrate can be used for the first flexible wiring substrate 31 and the second flexible wiring substrate 32. In the present form, a single-sided mounting substrate is used for the first flexible wiring substrate 31 and the second flexible wiring substrate 32. Thus, output electrodes (first output electrode 313 and second output electrode 323), mounting electrodes of the first drive IC 21 and the second drive IC 22, wires, and the like (not illustrated) are formed on the one surface 316 and the one surface 326 (see FIG. 4) of the first flexible wiring substrate 31 and the second flexible wiring substrate 32. In addition, either a single-layer substrate in which wires are formed of a metal layer of the same layer and a multilayer substrate in which wires are formed of a plurality of metal layers may be used for the first flexible wiring substrate 31 and the second flexible wiring substrate 32, but, in the present form, a single-layer substrate is used for the first flexible wiring substrate 31 and the second flexible wiring substrate 32.

Configuration of Extension Substrate

On the first mounting substrate 51, one end 411 of a first extension substrate 41 is connected to an end portion 312 on a side opposite to the element substrate 101 side with respect to the first drive IC 21 of the first flexible wiring substrate 31, and a first end portion 412 side which is the other end of the first extension substrate 41 extends to a side opposite to the element substrate 101 side. The first extension substrate 41 is configured by a flexible wiring substrate, and a plurality of first wires 415 extend from the first end portion 412 toward the one end 411. A plurality of electrodes (not illustrated) formed in the end portion 312 of the first flexible wiring substrate 31 are connected to a plurality of electrodes (not illustrated) formed in the one end 411 of the first extension substrate 41. The first end portion 412 of the first extension substrate 41 is formed in a linear shape, and a first plug 419 of a substrate-to-substrate connector is configured therein.

On the second mounting substrate 52, one end 421 of a second extension substrate 42 is connected to an end portion 322 on a side opposite to the element substrate 101 side with respect to the second drive IC 22 of the second flexible wiring substrate 32, and a second end portion 422 side which is the other end of the second extension substrate 42 extends to a side opposite to the element substrate 101 side. A plurality of electrodes (not illustrated) formed in the end portion 322 of the second flexible wiring substrate 32 are connected to a plurality of electrodes (not illustrated) formed in the one end 421 of the second extension substrate 42. The second extension substrate 42 is configured by a flexible wiring substrate, and a plurality of second wires 425 extend from the second end portion 422 toward the one end 421. The second end portion 422 of the second extension substrate 42 is formed in a linear shape, and a second plug 429 of a substrate-to-substrate connector is configured therein.

Here, a dimension of the first flexible wiring substrate 31 in the y direction is smaller than a dimension of the first extension substrate 41 in the y direction, and a dimension of the second flexible wiring substrate 32 in the y direction is smaller than a dimension of the second extension substrate 42 in the y direction. A single-sided wiring substrate and a double-sided wiring substrate can be used for the first extension substrate 41 and the second extension substrate 42. In the present form, a double-sided wiring substrate is used for the first extension substrate 41 and the second extension substrate 42.

In the electro-optical device 1 in which the first mounting substrate 51 and the second mounting substrate 52 are connected to the electro-optical panel 100, the first extension substrate 41 and the second extension substrate 42 are bent in a direction where at least one of the extension substrates is separated from the other extension substrate. As a result, the first end portion 412 of the first extension substrate 41 and the second end portion 422 of the second extension substrate 42 do not overlap each other and extend on a same linear line L. In the present embodiment, the first extension substrate 41 is bent obliquely and linearly in a direction separated from the second extension substrate 42 in a middle position in the length direction (y direction), the second extension substrate 42 is bent obliquely and linearly in a direction separated from the first extension substrate 41 in a middle position in the length direction, and the first extension substrate 41 and the second extension substrate 42 are formed in a substantially symmetrical planar shape.

Here, the end portion 312 of the first flexible wiring substrate 31 and the end portion 322 of the second flexible wiring substrate 32 are disposed to be shifted in the y direction. Accordingly, lengths of the first extension substrate 41 and the second extension substrate 42 are different from each other. In the present form, the end portion 312 of the first flexible wiring substrate 31 is positioned on the element substrate 101 side from the end portion 322 of the second flexible wiring substrate 32. Thus, the first extension substrate 41 is longer than the second extension substrate 42 by an amount corresponding to the amount of shift between the end portion 312 of the first flexible wiring substrate 31 and the end portion 322 of the second flexible wiring substrate 32 in the y direction. Therefore, the first end portion 412 of the first extension substrate 41 and the second end portion 422 of the second extension substrate 42 do not overlap each other, and extend on the linear line L parallel to an edge of the element substrate 101 in the y direction.

In this state, a first plug 419 formed in the first end portion 412 of the first extension substrate 41 is coupled to a first socket 619 formed on the wiring substrate 60 configured by a rigid substrate, and a second plug 429 formed in the second end portion 422 of the second extension substrate 42 is coupled to a second socket 629 formed on the wiring substrate 60 configured by a rigid substrate. The wiring substrate 60 inputs various power supply voltages and various signals from a high-level circuit to the first drive IC 21 via the first extension substrate 41 and the first flexible wiring substrate 31. As a result, the first drive IC 21 outputs the various signals to the element substrate 101 via the first flexible wiring substrate 31. In addition, the wiring substrate 60 inputs various power supply voltages and various signals from a high-level circuit to the second drive IC 22 via the second extension substrate 42 and the second flexible wiring substrate 32. As a result, the second drive IC 22 outputs the various signals to the element substrate 101 via the second flexible wiring substrate 32.

In the present form, double-sided wiring substrates are used as the first extension substrate 41 and the second extension substrate 42. Thus, some parts of the first wire 415 and the second wire 425 may be formed on one surface of the first extension substrate 41 and one surface of the second extension substrate 42, and the other parts and ground wires of the first wires 415 and the second wires 425 may be formed on the other surfaces. In addition, a conductive pattern to which a ground potential is applied may be formed on all the other surfaces of the first extension substrate 41 and the second extension substrate 42.

Structure of Protective Film

Figure 5:
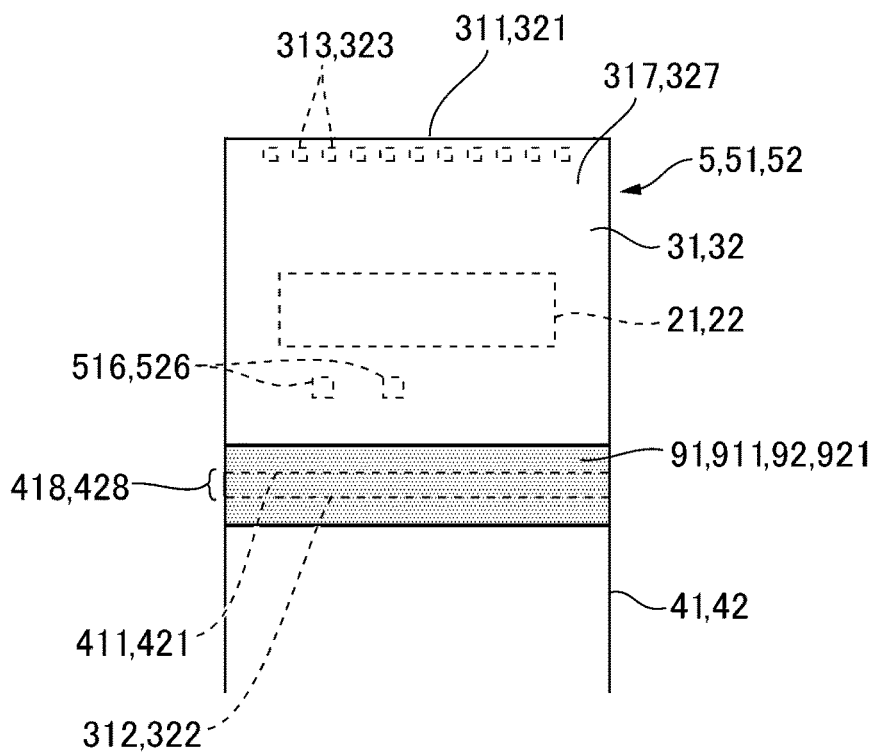
FIG. 5 is an explanatory view when a connection portion between a mounting substrate and an extension substrate illustrated in FIG. 2 is viewed from one surface side of the mounting substrate.
Figure 6:
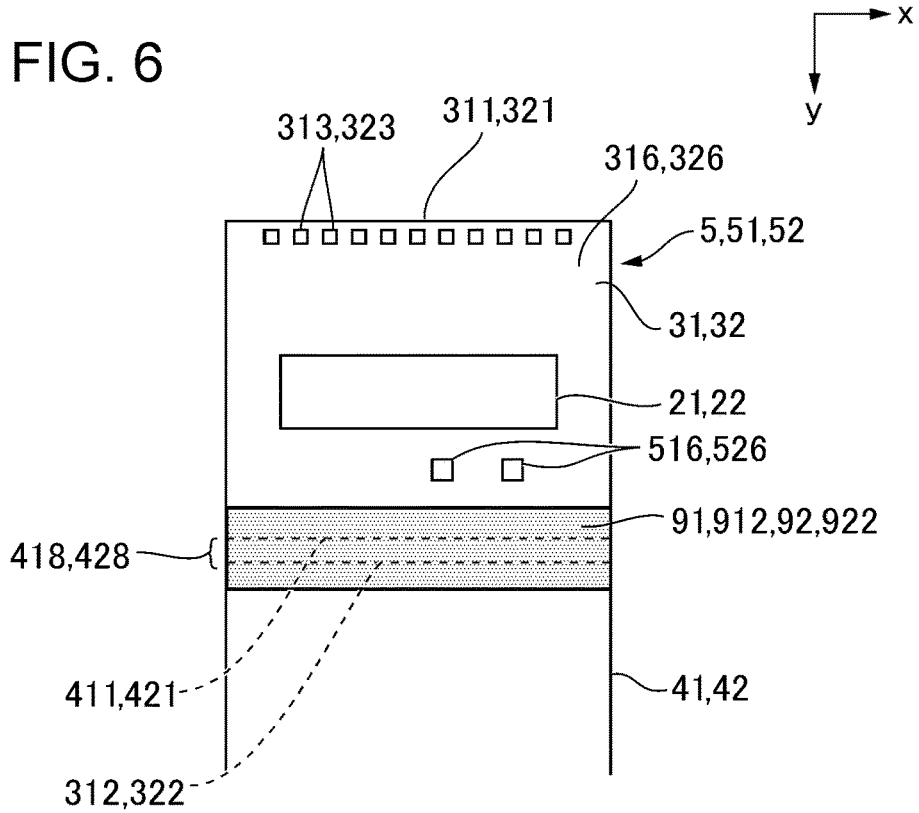
FIG. 6 is an explanatory view when the connection portion between the mounting substrate and the extension substrate illustrated in FIG. 2 is viewed from the other surface side of the mounting substrate.

FIG. 5 is an explanatory view when a connection portion between the mounting substrate 5 and the extension substrate illustrated in FIG. 2 is viewed from one surface side of the mounting substrate 5. FIG. 6 is an explanatory view when a connection portion between the mounting substrate 5 and the extension substrate illustrated in FIG. 2 is viewed from the other surface side of the mounting substrate 5.

As illustrated in FIGS. 4, 5, and 6, a first protective film 91 is affixed to a connection portion 418 between the first mounting substrate 51 and the first extension substrate 41, so as to be covered by at least one of the one surface 316 side and the other surface 317 side which is a surface side opposite to the one surface 316 side. In addition, a second protective film 92 is affixed to a connection portion 428 between the second mounting substrate 52 and the second extension substrate 42, so as to be covered by at least one of the one surface 326 side and the other surface 327 side which is a surface side opposite to the one surface 326 side.

As illustrated in FIGS. 4 and 5, in the present form, a protective film 911 which covers the connection portion 418 between the first mounting substrate 51 and the first extension substrate 41 from the other surface 317 side is provided as the first protective film 91. In addition, a protective film 921 which covers the connection portion 428 between the second mounting substrate 52 and the second extension substrate 42 from the other surface 327 side is provided as the second protective film 92.

In addition, as illustrated in FIGS. 4 and 6, in the present form, a protective film 912 which covers the connection portion 418 between the first mounting substrate 51 and the first extension substrate 41 from the one surface 316 side is provided as the first protective film 91. In addition, a protective film 922 which covers the connection portion 428 between the second mounting substrate 52 and the second extension substrate 42 from the one surface 326 side is provided as the second protective film 92.

Here, the first protective film 91 (protective films 911 and 612) and the second protective film 92 (protective films 921 and 622) are formed of an adhesive film including a film of polyester, polyimide, polyethylene terephthalate, or the like, and has insulating properties and moisture resistance.

Heat Dissipation Structure

Figure 7:
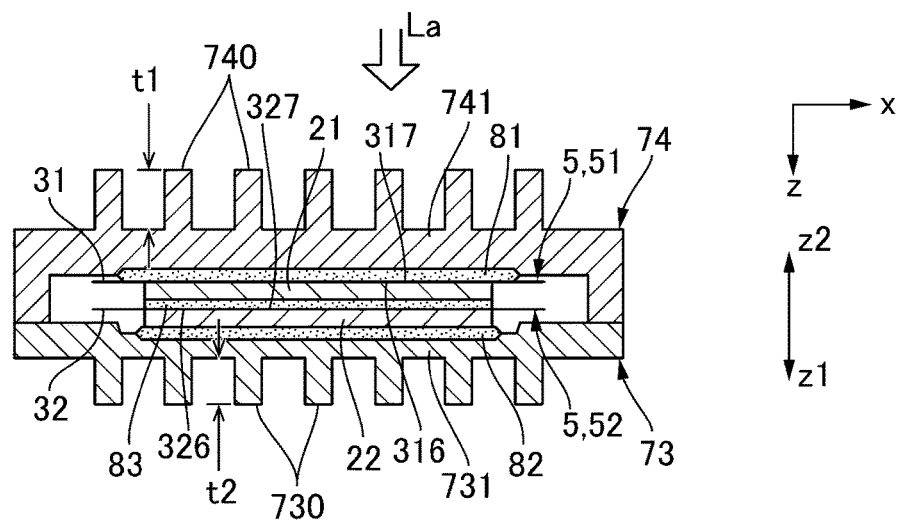
FIG. 7 is a cross-sectional view schematically illustrating a state where the electro-optical device illustrated in FIG. 1 is cut along line VII-VII.
Figure 8:
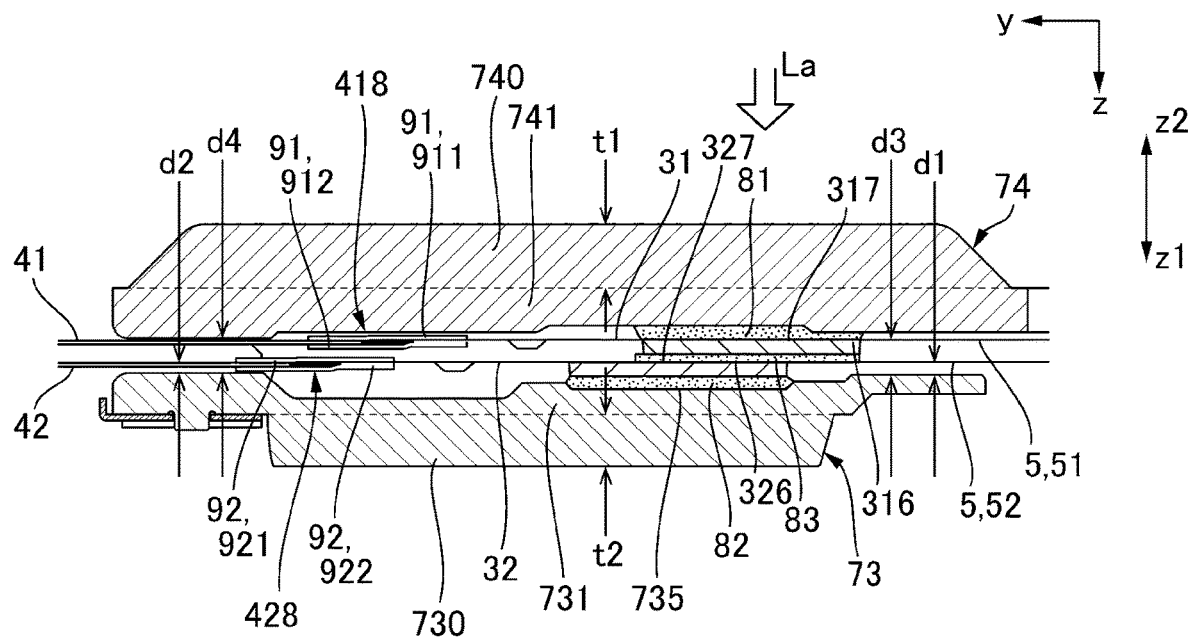
FIG. 8 is a cross-sectional view schematically illustrating a state where the electro-optical device illustrated in FIG. 1 is cut along line VIII-VIII.

FIG. 7 is a cross-sectional view schematically illustrating a state where the electro-optical device 1 illustrated in FIG. 1 is cut along a line VII-VII. FIG. 8 is a cross-sectional view schematically illustrating a state where the electro-optical device 1 illustrated in FIG. 1 is cut along a line VIII-VIII.

In the electro-optical device 1 according to the present form illustrated in FIG. 4, the sum total of thicknesses of the flexible wiring substrates (the first flexible wiring substrate 31 and the second flexible wiring substrate 32) used for the plurality of mounting substrates 5 (the first mounting substrate 51 and the second mounting substrate 52) 32) and thicknesses of the drive ICs (the first drive IC 21 and the second drive IC 22) is equal to or less than the thickness t of the electro-optical panel 100. Thus, as illustrated in FIGS. 7 and 8, even if the first heat dissipation plate portion 73 and the second heat dissipation plate portion 74 are disposed on both sides of a part where the drive ICs (the first drive IC 21 and the second drive IC 22) in the thickness direction (z direction) are disposed in the mounting substrates 5 (the first mounting substrate 51 and the second mounting substrate 52), a thickness of a part where the first heat dissipation plate portion 73 and the second heat dissipation plate portion 74 are disposed is thin. Here, the first heat dissipation plate portion 73 and the second heat dissipation plate portion 74 overlap the connection portion 418 between the first mounting substrate 51 and the first extension substrate 41 and the connection portion 428 between the second mounting substrate 52 and the second extension substrate 42, from both sides in the thickness direction.

In the present form, an adhesive layer 81 is provided between the other surface 317 of the first flexible wiring substrate 31 of the first mounting substrate 51 and the second heat dissipation plate portion 74, and the other surface 317 of the first flexible wiring substrate 31 adheres to the second heat dissipation plate portion 74. The adhesive layer 81 is provided in at least the part of the other surface 317 of the first flexible wiring substrate 31 corresponding to the disposition of the first drive IC 21, fixes the first mounting substrate 51 to the second heat dissipation plate portion 74, and promotes heat dissipation of the first drive IC 21. In addition, the adhesive layer 82 is provided between the one surface 316 side of the second flexible wiring substrate 32 of the second mounting substrate 52 and the first heat dissipation plate portion 73. The adhesive layer 82 is provided in at least the second drive IC 22 on the one surface 316 of the second flexible wiring substrate 32, fixes the second mounting substrate 52 to the first heat dissipation plate portion 73, and promotes heat dissipation of the second drive IC 22. Furthermore, an adhesive layer 83 is provided between the first mounting substrate 51 and the second mounting substrate 52. The adhesive layer 83 is provided in the part where the first drive IC 21 overlaps the second drive IC 22, fixes the first mounting substrate 51 to the second mounting substrate 52, and promotes heat dissipation of the first drive IC 21 or the second drive IC 22.

As illustrated in FIG. 2, in at least a part, which corresponds to the second drive IC 22, of a surface of the first heat dissipation plate portion 73 that the second mounting substrate 52 overlaps, a concave portion 735 having a groove 736 that is formed on the bottom of the concave portion and serves as a reservoir portion of the adhesive layer 82 is formed. In addition, while not illustrated, a groove or a concave portion serving as a reservoir portion of the adhesive layer 81 is also formed in the part corresponding to at least the first drive IC 21, on a surface of the second heat dissipation plate portion 74 that the first mounting substrate 51 overlaps. By increasing thermal conductivity and elasticity of the adhesive layers 81, 82, and 83, it is possible to effectively dissipate the heat from the first drive IC 21 or the second drive IC, and to protect the first drive IC 21 or the second drive IC from a mechanical shock.

In the present form, as illustrated in FIG. 8, when an interval on the electro-optical panel 100 side is set to d1 with respect to the first drive IC 21 and the second drive IC 22 of the second mounting substrate 52 positioned on the first heat dissipation plate portion 73 side and the first heat dissipation plate portion 73 among the plurality of mounting substrates 5, and an interval between the second extension substrate 42 positioned closest to the first heat dissipation plate portion 73 side and the first heat dissipation plate portion 73 among the plurality of extension substrates is set to d2, the intervals d1 and d2 have the following relationship. Thus, the heat generated by the first drive IC 21 and the second drive IC 22 can escape between the first heat dissipation plate portion 73 and the second mounting substrate 52.

d1>d2

In addition, when an interval between the first heat dissipation plate portion 73 on the electro-optical panel 100 side and the second heat dissipation plate portion 74 is set to d3 with respect to the first drive IC 21 and the second drive IC 22, and an interval between the first heat dissipation plate portion 73 and the second heat dissipation plate portion 74 in the part where the first extension substrate 41 and the second extension substrate 42 are positioned is set to d4, the intervals d3 and d4 have the following relationship. Thus, heat generated by the first drive IC 21 and the second drive IC 22 can escape between the first heat dissipation plate portion 73 and the second heat dissipation plate portion 74 on the electro-optical panel 100 side with respect to the first drive IC 21 and the second drive IC 22.

d3>d4

The entire interval between the first heat dissipation plate portion 73 and the second heat dissipation plate portion 74 may be filled with an adhesive layer. In addition, grease layers may be provided instead of the adhesive layers 81, 82, and 83.

Electrical Configuration of Electro-Optical Device 1

Figure 9:
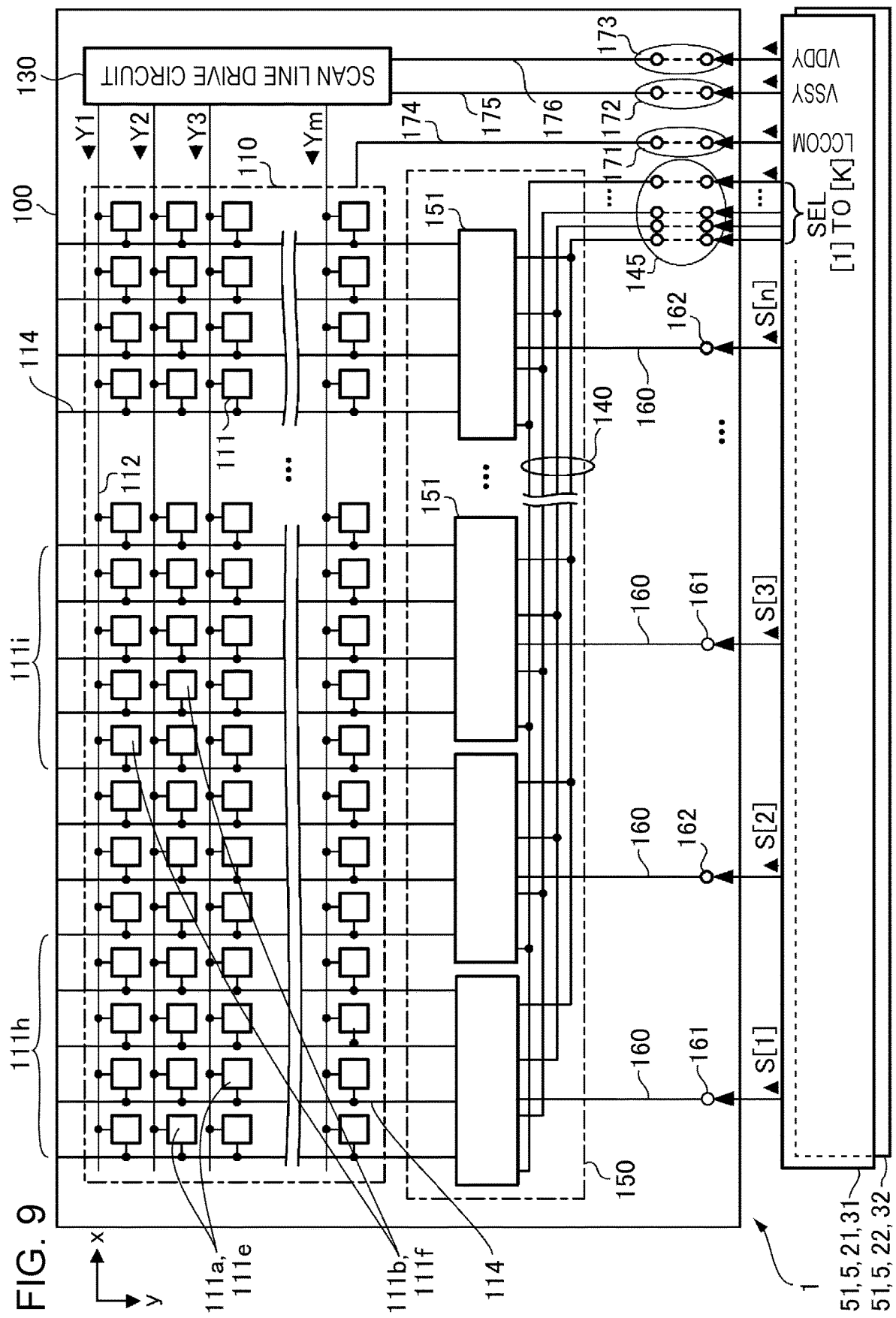
FIG. 9 is an explanatory diagram illustrating an aspect of an electrical configuration of the electro-optical device illustrated in FIG. 1.

FIG. 9 is an explanatory diagram illustrating one aspect of an electrical configuration of the electro-optical device 1 illustrated in FIG. 1. As illustrated in FIG. 9, the electro-optical panel 100 includes a pixel region 110 (display region), a scan line drive circuit 130, a data line selection circuit 150 (selection circuit), n image signal lines 160, n image signal input terminals (the first terminals 161 and the second terminals 162), k selection signal lines 140, k selection signal input terminals 145, a plurality of power supply terminals 171, 172, and 173, and power supply lines 174, 175, and 176 corresponding to the power supply terminals 171, 172, and 173, respectively. n is an integer of 1 or larger, and k is an integer of 2 or larger. In the form illustrated in FIG. 9, k=4. The elements are formed on the element substrate 101 illustrated in FIG. 2. On the element substrate 101, the data line selection circuit 150 is formed along one side of a peripheral portion of the pixel region 110, and the scan line drive circuit 130 is formed along another side crossing a side where the data line selection circuit 150 is formed.

The first drive IC 21 and the second drive IC 22 output image signals indicating an image to be displayed on the electro-optical panel 100 in accordance with a control signal, a control signal, image data, and the like which are input from an external high-level circuit (not illustrated) via the first flexible wiring substrate 31 and the second flexible wiring substrate 32 (see FIG. 2). The electro-optical panel 100 displays an image, based on a clock signal and an image signal which are input from the first drive IC 21, the first flexible wiring substrate 31, the second drive IC 22, and the second flexible wiring substrate 32. The first drive IC 21 and the second drive IC 22 have the same configuration and output the same signal except for the image signal.

The pixel region 110 displays an image. The pixel region 110 includes m scan lines 112, (k×n) data lines 114, and (m×k×n) pixels 111. m is an integer of 1 or larger. The pixel 111 includes a pixel electrode 118. The pixel 111 is provided corresponding to an intersection between the scan line 112 and the data line 114, and is arranged in a matrix of m rows×(k×n) columns. The scan lines 112 transmit scan signals Y1, Y2, Y3, . . . , Ym, and are provided in a row direction (x direction) from the scan line drive circuit 130. The data lines 114 transmit data signals, and are provided in a column direction (y direction) from the data line selection circuit 150.

In the pixel region 110, (k×m) pixels 111 corresponding to the k (column) data lines 114 form one pixel group (block). For example, there are provided a first pixel group 111h in which a plurality of (k columns) first pixel columns 111e, each including a plurality of (m) first pixels 111a arranged in the y direction, are arranged in the X direction, and a second pixel group 111i in which a plurality of (k columns) second pixel columns 111f, each including a plurality of (m) second pixels 111b arranged in the y direction, are arranged in the X direction. Here, the pixels 111 belonging to the same pixel group are connected to the same image signal line 160 via the data line selection circuit 150. Accordingly, the electro-optical panel 100 includes n (rows) pixel groups divided into n blocks by n (column) image signal lines 160 or n image signal input terminals (the first terminals 161 and the second terminals 162).

The scan line drive circuit 130 selects a row to write data from among the plurality of pixels 111 arranged in a matrix. Specifically, the scan line drive circuit 130 outputs a scan signal for selecting one scan line 112 from among the plurality of scan lines 112. The scan line drive circuit 130 supplies the scan signals Y1, Y2, Y3, . . . , Ym to the scan lines 112 of the first row, the second row, the third row, . . . , the m-th row. The scan signals Y1, Y2, Y3, . . . , Ym become, for example, a high level sequentially and exclusively.

In each pixel group, the data line selection circuit 150 selects a column (pixel column) of pixels 111 to which an image signal is written. Specifically, the data line selection circuit 150 selects at least one data line 114 from among the k data lines 114 belonging to the pixel group in accordance with the selection signals SEL[1] to SEL[k]. The data line 114 is connected to one image signal line 160 one by one by the data line selection circuit 150 by using k data lines as one unit. In the present form, the data line selection circuit 150 has n demultiplexers 151 corresponding to each of n pixel groups.

The image signal lines 160 connect the image signal input terminals (the first terminals 161 and the second terminals 162) to the data line selection circuit 150. The image signal line 160 transmits the image signals S (S[1] to S[n]) input from the first flexible wiring substrate 31 and the second flexible wiring substrate 32 via the image signal input terminals (the first terminals 161 and the second terminals 162) to the data line selection circuit 150, and is provided in n columns (pieces), corresponding to n image signal input terminals (the first terminals 161 and the second terminals 162) or each of n pixel groups. The image signal S indicates data to be written to the pixel 111. Here, an "image" means a still image or a moving image. One image signal line 160 is connected to k data lines 114 via a data line selection circuit 150. Thus, in the image signal S, data supplied to the k data lines 114 are time-division-multiplexed.

The selection signal lines 140 connect the selection signal input terminals 145 to the demultiplexers 151 of the data line selection circuit 150. The selection signal lines 140 (140[1] to 140[k]) transmit the selection signals SEL (SEL[1] to SEL[k]) input from the selection signal input terminal 145 (145[1] to 145[k]), and k selection signal lines are provided. The selection signals SEL sequentially become a high level.

The image signal input terminals (the first terminals 161 and the second terminals 162) are connected to the first flexible wiring substrate 31 and the second flexible wiring substrate 32, and the image signal S[j] is supplied therethrough (j is an integer satisfying $1 \leq j \leq n$). In this example, the image signals S[1], S[3], S[5], ..., S[2t−1] are supplied from the first drive IC 21 to the image signal input terminals (the first terminals 161 and the second terminal 162) corresponding to the image signal lines 160 of odd-numbered columns among the first column, the third column, the fifth column, ..., the (2t−1)th column (t is an integer satisfying $1 \geq t \geq n/2$). In addition, the image signals S[2], S[4], S[6], ..., S[2t] are supplied from the second drive IC 22 to the image signal input terminals (the first terminals 161 and the second terminal 162) corresponding to the image signal lines 160 of even-numbered columns among the second column, the fourth column, the sixth column, ..., the (2t)th column. The image signals S are so-called data signals, and analog signals having different waveforms according to display of an image are supplied to the image signal input terminals (the first terminals 161 and the second terminals 162).

The selection signal input terminals 145 are connected to the first flexible wiring substrate 31 and the second flexible wiring substrate 32, and selection signals SEL configured by pulse signals are supplied thereto. The selection signals SEL are timing signals for selecting the data lines 114 in the data line selection circuit 150. The selection signal input terminals 145 include a terminal to which the first flexible wiring substrate 31 is connected and a terminal which is connected to the second flexible wiring substrate 32, and the selection signal SEL is supplied from both or one of the first drive IC 21 of the first flexible wiring substrate 31 and the second drive IC 22 of the second flexible wiring substrate 32. In the present form, the selection signals SEL having the same waveform are supplied to the selection signal input terminals 145 corresponding to each of the first flexible wiring substrate 31 and the second flexible wiring substrate 32. Thus, the selection signal input terminals 145 are illustrated so as not to be distinguished as the terminal to which the first flexible wiring substrate 31 is connected and the terminal connected to the second flexible wiring substrate 32, but may be distinguished as the terminal to which the first flexible wiring substrate 31 is connected and the terminal to which the second flexible wiring substrate 32 is connected like the first terminal 161 and the second terminal 162.

The power supply terminal 171, the power supply terminal 172, and the power supply terminal 173 are connected to the first flexible wiring substrate 31 and the second flexible wiring substrate 32, and power supply voltages are supplied from a high-level circuit thereto via the first flexible wiring substrate 31 and the second flexible wiring substrate 32 without passing through the first drive IC 21 and the second drive IC 22. The power supply voltages are used as power sources in the electro-optical panel 100, and are DC voltages in this example. The power supply terminal 171 supplies a voltage LCCOM, the power supply terminal 172 supplies a voltage VSSY, and the power supply terminal 173 supplies a voltage VDDY. The voltage LCCOM is a reference potential of a voltage applied to a liquid crystal layer. The voltage VSSY is a power supply potential on a low voltage side of the scan line drive circuit 130. The voltage VDDY is a power supply potential on a high voltage side of the scan line drive circuit 130. The power supply terminals 171, 172, 173 are illustrated so as not to be distinguished as the terminal to which the first flexible wiring substrate 31 is connected and the terminal connected to the second flexible wiring substrate 32, but may be distinguished as the terminal to which the first flexible wiring substrate 31 is connected and the terminal connected to the second flexible wiring substrate 32 like the first terminal 161 and the second terminal 162.

Each of the power supply terminals 171, 172, and 173 may be provided on both sides in the x direction. This is to correspond to a configuration in which the scan line drive circuit 130 is provided on each of the left and right sides of the element substrate 101. In the present form, only one scan line drive circuit 130 is configured, and thus, the power supply terminals 172 and 173 are provided only on one side in the x direction.

In the present embodiment, data to be written to the pixels 111 of the [k×j−k+1]th column to the [k×j]th column which are the k pixels 111 of the corresponding pixel group is time-division-multiplexed in the image signal S[j]. In addition, in a case where S[j] is an odd-numbered S[2t−1], the image signal is supplied from the first drive IC 21 to the data line 114 of the odd-numbered pixel group. In a case where S[j] is an even-numbered S[2t], the image signal is supplied from the second drive IC 22 to the data line 114 of the even-numbered pixel group. According to such a configuration, two drive ICs of the first drive IC 21 and the second drive IC 22 are used, and thus, it is possible to write data to twice as many pixels in one cycle as compared with a case of using one drive IC. As described above, by disposing the first terminal 161 and the second terminal 162, a high definition, high quality, and compact electro-optical device 1 can be realized.

Main Effect of Present Form

As described above, in the electro-optical device 1 according to the present form, the holder 70 for holding the electro-optical panel 100 includes the first heat dissipation plate portion 73 and the second heat dissipation plate portion 74 which overlap the part where the first drive IC 21 and the second drive IC 22 are mounted from both sides, among the parts where the plurality of mounting substrates 5 overlap and extend. Accordingly, the heat generated by the first drive IC 21 and the second drive IC 22 can efficiently escape through the first heat dissipation plate portion 73 and the second heat dissipation plate portion 74. In addition, the second heat dissipation plate portion 74 is formed integrally with the second holder member 72, whereas the first heat dissipation plate portion 73 is formed separately from the first holder member 71, and thus, after the second heat dissipation plate portion 74 is disposed on one side of the part where the first drive IC 21 and the second drive IC 22 are mounted, among the parts where the plurality of mounting substrates 5 overlap and extend, the first heat dissipation plate portion 73 may be disposed on the other side, and accordingly, it is not necessary to pass a plurality of mounting substrates 5 between the first heat dissipation plate portion 73 and the second heat dissipation plate portion 74.

Thus, it is possible to easily provide the first heat dissipation plate portion 73 and the second heat dissipation plate portion 74 on both sides of the plurality of mounting substrates 5 without requiring much labor. In addition, since there is no need to pass the plurality of mounting substrates 5 between the first heat dissipation plate portion 73 and the second heat dissipation plate portion 74, it is not necessary to provide a wide gap between the mounting substrate 5 and the first heat dissipation plate portion 73 and between the mounting substrate 5 and the second heat dissipation plate portion 74, and to properly dispose the first heat dissipation plate portion 73 and the second heat dissipation plate portion 74 on both sides of the plurality of mounting substrates 5, and thereby, the heat dissipation performance can be improved. Therefore, it is possible to easily and properly provide heat dissipation plate portions on both sides of the plurality of mounting substrates 5, and thus, the electro-optical device 1 with high definition, a small size, and high reliability can be realized.

In addition, among the first heat dissipation plate portion 73 and the second heat dissipation plate portion 74, a protrusion dimension of the second heat dissipation fin 740 of the second heat dissipation plate portion 74 positioned on an incident side of a light source light is larger than a protrusion dimension of the first heat dissipation fin 730 of the first heat dissipation plate portion 73. Accordingly, even in a case where heat of the second holder member 72 whose temperature increases due to incident light source light is transmitted to the second heat dissipation plate portion 74, an increase of the temperature of the second heat dissipation plate portion 74 can be suppressed. In addition, since the protrusion dimension of the first heat dissipation fin 730 is small, a thickness of the part where the first heat dissipation plate portion 73 and the second heat dissipation plate portion 74 are provided can be reduced.

In addition, at least some parts of the drive ICs (the first drive IC 21 and the second drive IC 22) overlap each other on the plurality of mounting substrates 5. Accordingly, heat generation sources configured by the first drive IC 21 and the second drive IC 22 are collectively disposed, and thereby, a heat dissipation structure which uses the first heat dissipation plate portion 73 and the second heat dissipation plate portion 74 can be easily configured.

In addition, since the refrigerant passage 78 is provided in the second holder member 72, even in a case where temperature of the second holder member 72 increases due to incident light source light, an increase of the temperature of the second holder member 72 can be suppressed by allowing the refrigerant such as air or liquid to flow through the refrigerant passage 78.

In addition, in each of the plurality of mounting substrates 5, the first extension substrate 41 and the second extension substrate 42, which are configured by flexible wiring substrates, are connected to the end portions 312 and 322 of the first flexible wiring substrate 31 and the second flexible wiring substrate 32. Thus, since the first flexible wiring substrate 31 and the second flexible wiring substrate 32 which are used for the mounting substrate 5 can be shortened, cost can be reduced. In addition, since the connection portion 418 between the first mounting substrate 51 and the first extension substrate 41 and the connection portion 428 between the second mounting substrate 52 and the second extension substrate 42 are covered by the first protective film 91 and the second protective film 92 having insulating properties and moisture resistance, it is possible to enhance strength, moisture resistance, insulating properties, and the like of the connection portions 418 and 428. Therefore, reliability of the connection portions 418 and 428 can be increased.

In addition, since the plurality of mounting substrates 5 (the first mounting substrate 51 and the second mounting substrate 52) connected to the electro-optical panel 100 have all the same configurations including sizes of the flexible wiring substrates (the first flexible wiring substrate 31 and the second flexible wiring substrate 32) and mounting positions of the drive ICs (the first drive IC 21 and the second drive IC 22), there is no need to prepare a plurality of types of mounting substrates 5. Accordingly, cost can be reduced.

In addition, since the first end portion 412 of the first extension substrate 41 and the second end portion 422 of the second extension substrate 42 extend on the same linear line L without overlapping each other, work is easily done when the first end portion 412 of the first extension substrate 41 and the second end portion 422 of the second extension substrate 42 are connected to a high-level circuit or the like. For example, if the first end portion 412 of the first extension substrate 41 and the second end portion 422 of the second extension substrate 42 overlap each other, the second end portion 422 needs to be inserted into the second socket 629 of a connector by turning over the first end portion 412. According to the present form, it is possible to insert the second end portion 422 into the second socket 629 of the connector without requiring such labor. In addition, since the first end portion 412 and the second end portion 422 extend on the same linear line L, the first socket 619 and the second socket 629 can be linearly disposed on the wiring substrate 60. Thus, it is possible to efficiently perform the work of inserting the first end portion 412 and the second end portion 422 into the first socket 619 and the second socket 629.

Another Embodiment

A case where the number of mounting substrates 5 is two is exemplified in the above-described embodiment, but the invention may be applied to a case where the number of mounting substrates 5 is three or more. The electro-optical device 1 is a liquid crystal device in the above-described embodiment, but the invention may be applied to a case where the electro-optical device 1 is an organic electroluminescence device.

Example of Mounting on Electronic Apparatus

Figure 10:
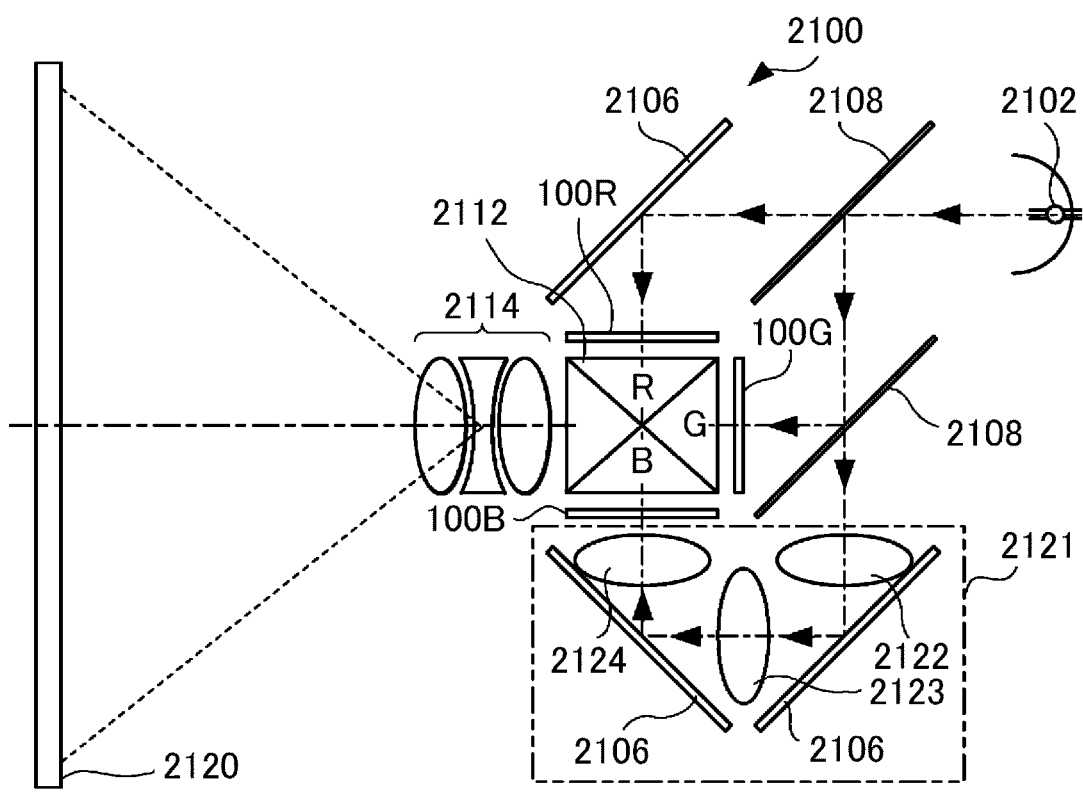
FIG. 10 is a schematic configuration view of a projection type display device which uses the electro-optical device to which the invention is applied.

An electronic apparatus which uses the electro-optical device 1 according to the above-described embodiment will be described. FIG. 10 is a schematic configuration view of a projection type display device (electronic apparatus) which uses the electro-optical device 1 to which the invention is applied. A projection type display device 2100 illustrated in FIG. 10 is an example of an electronic apparatus which uses the electro-optical device 1. In the projection type display device 2100, the electro-optical device 1 is used as a light valve, and high-definition and bright display can be performed without enlarging the device. As illustrated in the figure, a lamp unit 2102 (light source unit) including a white light source such as a halogen lamp is provided inside the projection type display device 2100. Projected light emitted from the lamp unit 2102 is separated into three primary colors of R (red), G (green), and B (blue) by three mirrors 2106 and two dichroic mirrors 2108 arranged therein. The separated projection light is guided to light valves 100R, 100G and 100B corresponding to the respective primary colors. Since light of the B color has a long optical path as compared with the other R color and G color, the light of the B color is guided through a relay lens system 2121 including an incident lens 2122, a relay lens 2123, and an emission lens 2124 so as to prevent loss from being made.

In the projection type display device 2100, three sets of liquid crystal devices, each including the electro-optical device 1, are provided corresponding to the R, G, and B colors, respectively. Configurations of the light valves 100R, 100G, and 100B are the same as the configuration of the above-described electro-optical panel 100, and are connected to a high-level circuit in the projection type display device 2100 via the first extension substrate 41 and the second extension substrate 42, respectively. Image signals for designating gradation levels of primary color components of each of R color, G color, and B color are respectively supplied from an external high-level circuit, processed by a high-level circuit in the projection type display device 2100, and the light valves 100R, 100G, and 100B are respectively driven. Lights modulated by the light valves 100R, 100G, and 100B, respectively, are incident on a dichroic prism 2112 from three directions. Then, in the dichroic prism 2112, the R color light and the B color light are reflected at 90 degrees, and the G color light transmits. Thus, after images of the respective primary colors are synthesized, a color image is projected on a screen 2120 by a projection lens group 2114 (projection optical system).

Another Projection Type Display Device

An LED light source or the like for emitting light of each color may be used as a light source unit for the projection type display device, and the projection type display device is configured such that color lights emitted from the LED light sources are supplied to other liquid crystal devices, respectively.

Another Electronic Apparatus

An electronic apparatus including the electro-optical device 1 to which the invention is applied is not limited to the projection type display device 2100 according to the above-described embodiment. The electronic apparatus may be used for an electronic device, for example, a projection type head up display (HUD), a direct view type head mounted display (HMD), a personal computer, a digital still camera, a liquid crystal television, or the like.

This application claims priority to Japan Patent Application No. 2017-019310 filed Feb. 6, 2017, the entire disclosures of which are hereby incorporated by reference in their entireties.

What is claimed is:

1. An electro-optical device comprising:
   an electro-optical panel;
   a mounting substrate having one end portion connected to the electro-optical panel;
   a drive IC that is mounted on one surface of the mounting substrate;
   a flexible wiring substrate having one end portion connected to the other end portion of the mounting substrate; and
   a holder that supports the electro-optical panel from both sides in a thickness direction,
   wherein the holder includes a first holder member that supports the electro-optical panel from one side in a thickness direction, a second holder member that supports the electro-optical panel from the other side in a thickness direction, a first heat dissipation plate portion that overlaps a part where the drive IC is mounted from one side of the electro-optical panel in a thickness direction, among parts where a plurality of the mounting substrates overlap and extend, and a second heat dissipation plate portion that overlaps a part where the drive IC of each of the plurality of mounting substrates is mounted from the other side of the electro-optical panel in the thickness direction, among the parts where the plurality of mounting substrates overlap and extend,
   wherein the second heat dissipation plate portion is formed integrally with the second holder member, and
   wherein the first heat dissipation plate portion is configured separately from the first holder member and the second heat dissipation plate portion, and is fixed to the second heat dissipation plate portion by a fixing unit.

2. The electro-optical device according to claim 1,
   wherein the second holder member and the second heat dissipation plate portion are positioned on an incident side of light source light with respect to the electro-optical panel.

3. The electro-optical device according to claim 2,
   wherein the first heat dissipation plate portion includes a first plate portion facing the second heat dissipation plate portion, and a plurality of first heat dissipation fins protruding from the first plate portion toward a side opposite to the second heat dissipation plate portion,
   wherein the second heat dissipation plate portion includes a second plate portion facing the first heat dissipation plate portion, and a plurality of second heat dissipation fins protruding from the second plate portion toward a side opposite to the first heat dissipation plate portion, and
   wherein protrusion dimensions of the plurality of second heat dissipation fins from the second plate portion are larger than protrusion dimensions of the plurality of first heat dissipation fins from the first plate portion.

4. An electronic apparatus comprising:
   the electro-optical device according to claim 3.

5. The electro-optical device according to claim 2,
   wherein each of the plurality of mounting substrates includes the drive IC of which at least a part overlaps each other.

6. An electronic apparatus comprising:
   the electro-optical device according to claim 5.

7. The electro-optical device according to claim 2,
   wherein a refrigerant passage extending along a side of the electro-optical panel is provided in the second holder member.

8. The electro-optical device according to claim 7,
   wherein the refrigerant passage extends along a plurality of sides of the electro-optical panel.

9. An electronic apparatus comprising:
   the electro-optical device according to claim 8.

10. The electro-optical device according to claim 7,
    wherein the second holder member includes a frame shape portion facing the first holder member and a flow path configuration plate that is fixed to the frame shape portion so as to overlap each other, and
    wherein the refrigerant passage is provided between the frame shape portion and the flow path configuration plate.

11. An electronic apparatus comprising:
    the electro-optical device according to claim 10.

12. An electronic apparatus comprising:
    the electro-optical device according to claim 7.

13. The electro-optical device according to claim 2,
    wherein one end of an extension substrate that is configured by a flexible wiring substrate is connected to an end portion on a side opposite to a side of the electro-optical panel with respect to the drive IC of the mounting substrate, and
    wherein a connection portion between the mounting substrate and the extension substrate is positioned between the first heat dissipation plate portion and the second heat dissipation plate portion.

14. The electro-optical device according to claim 13, wherein an interval between the first heat dissipation plate portion and the mounting substrate on the side of the electro-optical panel with respect to the drive IC is wider than an interval between the first heat dissipation plate portion and the extension substrate.

15. The electro-optical device according to claim 13, wherein an interval between the first heat dissipation plate portion and the second heat dissipation plate portion on the side of the electro-optical panel with respect to the drive IC is wider than an interval between the first heat dissipation plate portion and the second heat dissipation plate portion in a part where the extension substrate is positioned.

16. An electronic apparatus comprising:
the electro-optical device according to claim 13.

17. An electronic apparatus comprising:
the electro-optical device according to claim 2.

18. The electro-optical device according to claim 1, wherein each of the plurality of mounting substrates has one surface side which is connected to the electro-optical panel and on which the drive IC is mounted.

19. The electro-optical device according to claim 1, wherein the two mounting substrates are connected to one side of the electro-optical panel.

20. An electronic apparatus comprising:
the electro-optical device according to claim 1.

* * * * *